United States Patent [19]

Kobayashi et al.

[11] Patent Number: 4,720,349

[45] Date of Patent: Jan. 19, 1988

[54] SLIDING MEMBER OF GRAPHITE-METAL BORIDES

[75] Inventors: Kazuo Kobayashi, Tosu; Kenji Miyazaki, Dazaifu; Tsuyoshi Hagio; Ichitaro Ogawa, both of Tosu; Hisayoshi Yoshida, Ogori; Kazutsugu Kashima, Tosu; Takashi Tada; Youichirou Hayashi, both of Fujisawa; Wataru Abe, Hiratsuka, all of Japan

[73] Assignees: The Agency of Industrial Science and Technology; Oiles Industry Co. Ltd., both of Tokyo, Japan

[21] Appl. No.: 794,849

[22] Filed: Nov. 4, 1985

[30] Foreign Application Priority Data

Nov. 7, 1984 [JP] Japan .................................. 59-233276

[51] Int. Cl.$^4$ ............................................. F16C 33/16
[52] U.S. Cl. .......................................... 252/12; 252/29; 252/30; 501/96; 501/99
[58] Field of Search ....................... 252/25, 12, 29, 30; 501/96, 99

[56] References Cited

U.S. PATENT DOCUMENTS

| 3,405,063 | 10/1968 | Boes et al. | 252/12 |
| 3,770,487 | 11/1973 | Cabsin et al. | 501/96 |
| 4,259,119 | 3/1981 | Watanabe et al. | 501/96 |
| 4,637,884 | 1/1987 | Miyazaki et al. | 252/12 |

FOREIGN PATENT DOCUMENTS 469719 8/1975 U.S.S.R. ................................ 252/12

Primary Examiner—William R. Dixon, Jr.
Assistant Examiner—Cynthia A. Prezlock
Attorney, Agent, or Firm—Cushman, Darby & Cushman

[57] ABSTRACT

Disclosed herein is a high temperature-resistant and abrasion-resistant sliding member of graphite-metal borides showing a friction coefficient of 0.01 to 0.09 and a specific amount of abrasion of 1.0 to $4.0 \times 10^{-8}$ mm$^2$/kg under the measuring conditions of a load of 20 kg/cm$^2$ and a sliding velocity of 5 m/min at an atmosphere temperature of 300° C., a bending strength of 230 to 900 kg.f/cm$^2$ and a Shore hardness of 28 to 45, produced by sintering (a) 70 to 93% by weight of amorphous carbon powder, (b) 5 to 20% by weight of at least one boride of a metal of IVa group, Va group of VIa group of the periodic table and (c) 2 to 10% by weight of powdery natural graphite, powdery Kish graphite or a mixture thereof.

5 Claims, 2 Drawing Figures

SLIDING MEMBER OF GRAPHITE-METAL BORIDES

BACKGROUND OF THE INVENTION

The present invention relates to a sliding member of graphite-metal borides which is useful as the member for the parts where friction is caused by sliding in bearings, cylinders, slide valves, etc., and more in detail, the present invention relates to a novel sliding member showing favorable specific properties to friction and abrasion, particularly at high temperatures, which is favorably suitable fitted for use under such conditions where the use of a fluid lubricant such as lubricating oils and greases is difficult, i.e., the so-called dry-friction conditions.

In recent years, with the development of mechatronics, the demands for the sliding members, which are excellent in frictional and abrasive properties, particularly in a high temperature range has been raised. For instance, since a fluid lubricant such as lubricating oils and greases cannot be used between the mutually contacting surfaces of the materials of the sliding part at a high temperature in a range of 200° to 500° C., a solid lubricant such as graphite and molybdenum disulfide is usually used. However, such a solid lubricant have no fluidity nor wettability as are generally seen in a fluid lubricant and accordingly, the solid lubricant cannot be applied by the means such as painting, impregnating, pouring, etc.

Namely, in the case of using a solid lubricant, it must be applied by the means such that (1) the friction surface is covered with a solid lubricant, (2) the sliding member per se are prepared of a solid lubricant, (3) the solid lubricant is used after being admixed with another material, etc. Since the lubricating effect of the solid lubricant used in any one of the above-mentioned means is exhibited at the first time after a part of the solid lubricant thus applied on the sliding, friction surface is transferred to the surface of the mating material by forming a film of a desired thickness thereon.

Accordingly, the frictional and abrasion properties of the thus applied solid lubricant is affected largely by film-forming property of the solid lubricant on the surface of the mating material.

As the solid lubricant for satisfying such a requirements, graphite which is excellent in self-lubricating property and thermal conductivity, non-melting property, small in thermal expansion and in addition, excellent in heat-resistance has been most frequently used.

The graphite used as sliding member is classified into natural graphite and artificial graphite in general, and in the field of which a solid lubricant itself is used as the sliding members, artificial graphite which is a little poor in the point of frictional and abrasive properties, however, by which shaped articles of a high strength are available has been generally used.

As the method for obtaining the shaped articles of a high strength from artificial graphite, a method comprising the steps of (1) molding an aggregate, for instance, powdery coke while using a binder such as coal-tar pitch which is carbonized or graphitized by heating or calcining, (2) calcining the thus molded material at a temperature of 700° to 1000° C., (3) impregnating the thus calcined material with an impregnating agent such as pitch, and (4) re-calcining the thus impregnated material and then thermally treating at a temperature of 2500 to 3000° C., thereby graphitizing the thus impregnated material has been hitherto adopted. In addition, in order to obtain a graphite shaped-articles of a higher strength, a method of impregnating the thus obtained graphite shaped-articles with a resin or a metal has been adopted.

Although the graphite shaped-articles of a high strength can be used as the sliding members, the frictional and abrasive properties and particularly, the film-forming property on the mating surface are still insufficient, and as a result, such a sliding members have demerits of high in friction coefficient and large in amount of abrasion. In addition, there is another demerit that it takes a very long term for graphitizing the powdery coke (generally, it takes 2 to 3 months for graphitizing the coke).

Formerly, the present inventors have proposed a process for producing a high-density graphite-boron carbide composite material, comprising adding boron carbide as a sintering-accelerator to powdery amorphous carbon or powdery artificial graphite and sintering the thus prepared mixture at a temperature of higher than 2000° C. under a pressure of higher than 200 kg/cm$^2$ (refer to Japanese Patent Publication No. 56-37192 (1981)).

Further, the present inventors have found that graphitization of powdery coke is accelerated by sintering a mixture of powdery coke and powdery boride of a metal of IVa group, Va group or VIa group of the periodic table for 30 min at a temperature of 2100° C. under a pressure of 200 kg/cm$^2$ (refer to "YOGYO KYOKAISHI" (Journal of the Ceramic Soc. of Japan), Vol. 8, No. 8, pp 416–422, 1979).

In addition, as a result of studying for solving the aforementioned defect of the sliding members, the present inventors have found a high temperature-resistant and abrasion-resistant sliding member of graphite-boron carbides produced by the steps of (1) mixing and stirring 65 to 95% by weight of powdery carbon of an average particle size of 10 to 150 μm and 5 to 35% by weight of powdery boron carbide of an average particle size of 0.5 to 2.5 μm until the powdery boron carbide is uniformly dispersed in the powdery carbon and (2) sintering the thus prepared mixture at a temperature between 2020° C. and the transition point of the structure of the thus formed mixture (refer to U.S. patent application Ser. No. 786,086, filed July 17, 1985).

For providing a novel sliding members, which are more excellent in frictional and abrasional properties at high temperature and can be used under the dry-friction conditions in which a liquid lubricant such as lubricating oil can be hardly used, the present inventors have further studied on the method for producing a high-density graphite composite material from a mixture prepared by adding and mixing a specific amount of a powdery boride to powdery coke, i.e., the method for producing a high-density graphite composite material by the steps of (1) adding and mixing a specific amount of powdery borides to powdery amorphous carbon such as powdery coke, (2) uniformly blending the thus obtained mixture and (3) sintering the thus obtained material under a pressure, and as a result of the present inventors' studies, it has been found that graphite-metal borides produced by sintering a mixture of (a) 70 to 93% by weight of powdery amorphous carbon, (b) 5 to 20% by weight of at least one powdery boride of a metal of IVa group, Va group or VIa group of the periodic table and (c) 2 to 10% by weight of powdery natural graphite, powdery Kish graphite or a mixture thereof, is the material for sliding members having more excellent specific properties, and based on the present inventors' finding, the present invention has been attained.

Namely, the object of the present invention is to be provided with sliding members which solve the demerits of transferring property of the solid lubricating film to the mating surface and the film-forming property of the material for sliding member as well as the frictional and abrasional property thereof at high temperature.

SUMMARY OF THE INVENTION

In an aspect of the present invention, there is provided a high temperature-resistant and abrasion-resistant sliding members of graphite-metal borides, which shows a friction coefficient of 0.01 to 0.09 and a specific amount of abrasion of 1.0 to $4.0 \times 10^{-8}$ mm$^2$/kg determined under the conditions of a load of 20 kg/cm$^2$, a sliding velocity of 5 m/min at an atmosphere temperature of 300° C., a bending strength of 230 to 900 kg.f/cm$^2$ and a Shore hardness of 28 to 45, and is produced by sintering a uniform mixture of (a) 70 to 93% by weight of powdery amorphous carbon, (b) 5 to 20% by weight of at least one powdery boride of a metal of IVa group, Va group or VIa group of the periodic table and (c) 2 to 10% by weight of powdery natural graphite, powdery Kish graphite or a mixture thereof.

BRIEF EXPLANATION OF DRAWING

Of the attached drawings.

DETAILED DESCRIPTION OF THE INVENTION

Figure 1:
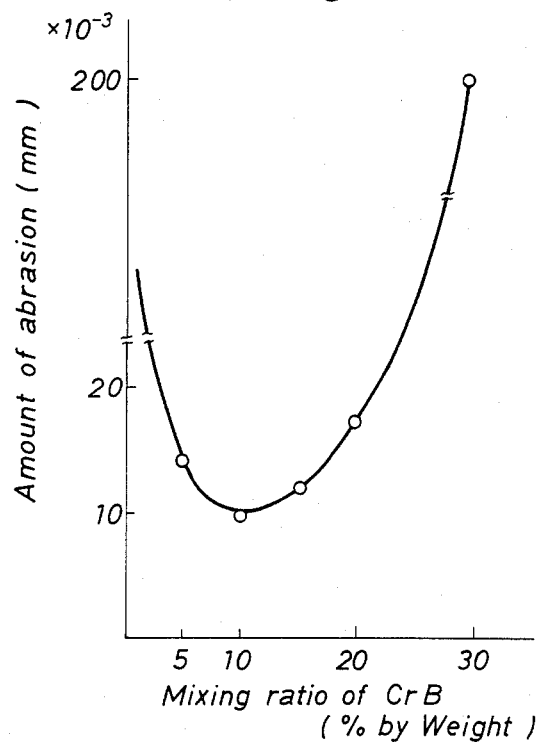
FIG. 1 is a graph showing the relationship between the mixing ratio of powdery amorphous carbon and chromium boride, and amount of abrasion of the sliding member produced from the mixture of powdery amorphous carbon and chromium boride according to the process of the present invention at a high temperature.

The sliding members according to the present invention comprise a high temperature-resistant and abrasion-resistant composite material of graphite-metal borides, produced by mixing (a) 70 to 93% by weight of powdery amorphous carbon, (b) 5 to 20% by weight of at least one boride of a metal selected from the metals belonging to IVa group, Va group and VIa group of the periodic table and (c) 2 to 10% by weight of powdery natural graphite, powdery Kish graphite or a mixture thereof, stirring the thus obtained mixture thereby uniformly dispersing the powdery metal borides and the powdery natural graphite, the powdery Kish graphite or the mixture thereof, and sintering the thus obtained uniform mixture at a temperature of 1800° to 2500° C., the sliding member showing a friction coefficient of 0.01 to 0.09 and a specific amount of abrasion of 1.0 to $4.0 \times 10^{-8}$ mm$^2$/kg determined under the conditions of a load of 20 kg/cm$^2$ and of a sliding velocity of 5 m/min at an atmosphere temperature of 300° C., a bending strength of 230 to 900 kg.f/cm$^2$ and a Shore hardness of 28 to 45.

In the present invention, the mixing ratio of the powdery amorphous carbon of an average particle size of 10 to 150 μm, preferably 80 to 120 μm used as the component (a) is 70 to 93% by weight, preferably 77 to 90% by weight and as the component (a), powdery coke, powdery anthracite, powdery carbon black, powdery charcoal, etc. may be mentioned. These may be used singly or in the form of a mixture thereof.

The mixing ratio of powdery metal borides of an average particle size of 0.5 to 20 μm, preferably 1 to 10 μm used as the component (b) according to the present invention is 5 to 20% by weight, preferably 7 to 15% by weight, and as the component (b), a powdery boride of a metal selected from the metals belonging to IVa group, Va group and VIa group of the periodic table may be used. As the metal boride, titanium boride (TiB), titanium diboride (TiB$_2$), zirconium diboride (ZrB$_2$), zirconium dodecarboride (ZrB$_{12}$), hafnium diboride (HfB$_2$), vanadium diboride (VB$_2$), niobium diboride (NbB$_2$), tantalum diboride (TaB$_2$), chromium boride (CrB), chromium diboride (CrB$_2$), molybdenum boride (MoB), molybdenum diboride (MoB$_2$), dimolybdenum boride (Mo$_2$B), dimolybdenum pentaboride (Mo$_2$B$_5$), wolfram boride (WB), wolfram diboride (WB$_2$), diwolfram boride (W$_2$B) and diwolfram pentaboride (W$_2$B$_5$) may be exemplified. These may be used singly or in the form of the mixture thereof.

From the view point that the powdery metal borides act as the accelerator of graphitization and sintering of the powdery amorphous carbon in sintering, their effects are observed, for instance, when the mixing ratio of the metal borides is around 3% by weight, and with the increase of the mixing ratio thereof, it is possible to obtain the graphite composite material more highly graphitized and highly densified.

In the case where the mixing ratio of the powdery metal borides is around 3% by weight, boron in the metal borides diffuses into the powdery amorphous carbon and makes a solid solution with the powdery amorphous carbon during sintering at a high temperature under a pressure, and as a result, the metal borides hardly remain in the thus obtained graphite composite material in the form of metal boride. Accordingly, in the case where such graphite composite material is used as the material for sliding member, the effect of the thus added metal borides on the improvement of the friction-resistant and abrasion-resistant properties of the sliding members at a high temperature does not observed.

Namely, the effect of the metal borides contained in the graphite composite material on the friction-resistant and abrasion-resistant properties of the sliding members lies in the promotion of the formation of a solid lubricating film of graphite on the surface of the mating material in the friction with the mating material, thereby increasing the durability of the thus formed solid film of graphite in the dry-friction, although the metal boride itself does not show any lubricating property as graphite and molybdenum disulfide.

The graphite composite material for the sliding members, produced by adding, for instance, 5% by weight of the powdery metal borides to the powdery amorphous carbon in the view point of increasing the graphitization and the density, and the favorably friction-resistant and abrasion-resistant properties of the sliding members, actually exhibited the improvements of graphitization and the high density, and it was actually recognized that the metal borides contained in the sliding members form a solid lubricating film on the surface of the mating material in the case of friction with the mating material and the friction-resistant and abrasion-resistant properties of the sliding members, particularly at a high temperature are improved.

However, in the case where the amount of addition of the metal borides to the powdery amorphous carbon was raised further while expecting the still improved properties of the sliding members thus produced, it was observed that the effect of the metal borides as the graphitization-accelerating agent became constant in the case where the amount of addition was higher than 10% by weight. Further, it was observed that the effect thereof on the friction-resistant and abrasion-resistant properties of the thus produced sliding members, particularly the effect thereof on the abrasion-resistant property was reduced suddenly and remarkably when the amount of addition thereof was over 20% by weight.

Such an occurrence of sudden reduction of the abrasion-resistant property of the sliding members is presumed due to the friction between the mating material and the metal borides which does not show any lubrication, since the metal borides are present in a large amount in the sliding members.

Regarding the above-mentioned phenomenon, the relationship between the amount of abrasion of the sliding members produced from a mixture of the powdery amorphous carbon and powdery chromium boride as the metal boride, and the amount of addition of powdery chromium boride (% by weight) in the mixture at a temperature of 300° C. is shown in FIG. 1. The relationship having been determined under the following experimental conditions.

Experimental conditions:
Dimensions of the sliding members (a solid brock):
20 mm in length, 20 mm in width and 7 mm in thickness,
Dimension of the mating material (stainless-steel cylinder):
20 mm in length, 18 mm in outer diameter and 14 mm in inner diameter,
Load: 20 kg/cm$^2$,
Velocity in test: 5 m/min,
Test machine: Thrust Test of Suzuki-Type.

The amount of abrasion was measured after 2 hours of the test time point.

The concave line in FIG. 1 showed a similar tendency in the test of the other sliding members produced by the metal boride other than chromium boride.

From the FIG. 1, it can be understood that the effect of the powdery metal boride as a graphitization-accelerator, a sintering-accelerator and further an agent for improving the friction-resistant and abrasion-resistant properties of the sliding members is suitably exhibited in the case where the amount of addition of the powdery metal boride is in a range of 5 to 20% by weight, preferably 7 to 15% by weight based on the total amount of the components of the raw material for the sliding members.

In the present invention, in order to further improve the friction-resistant and abrasion-resistant properties of the sliding members, a specified amount of powdery natural graphite, powdery Kish graphite or a mixture thereof as the component (c) is further admixed with the mixture of powdery amorphous carbon and powdery metal boride.

The graphite has excellent self-lubricating property, and in the case of being added to the other components (a) and (b), the thus produced sliding members contains the graphite which has been more highly graphitized than the graphite which has been converted from the powdery amorphous carbon and presents in the sliding members as the base. The thus added graphite forms a film on the surface of the mating material with the solid film-forming property of the metal boride and exhibits the effect of remarkably improving the friction-resistant and abrasion-resistant properties of the sliding members, particularly in the high temperature.

The effect of the thus added graphite component (c) is exhibited in the case of more than 2% by weight of the powdery graphite (c), and the maximum effect thereof is exhibited by the addition of 5% by weight of the powdery graphite (c). However, the strength of the sliding members, obtained by adding more than 10% by weight of the powdery graphite, is not only reduced but also the abrasion-resistant property thereof is also deteriorated.

Figure 2:
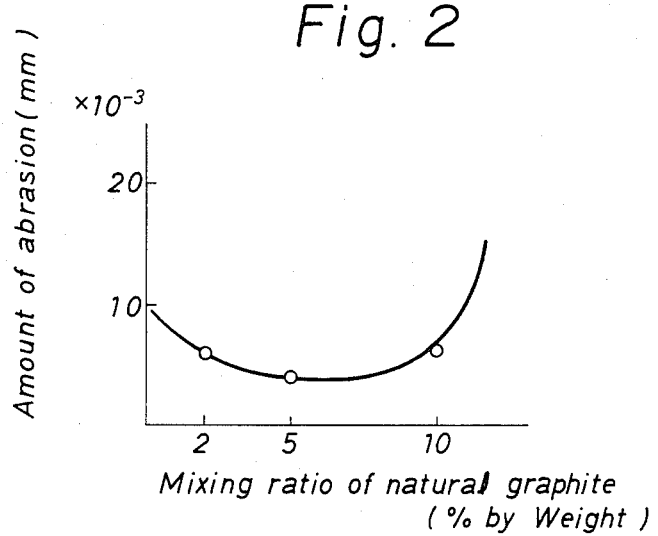
FIG. 2 is a graph showing the relationship between the mixing ratio of powdery natural graphite and the mixture of powdery amorphous carbon and chromium boride of which the mixing ratio thereof is constant, and amount of abrasion of the sliding member produced from the mixture of powdery amorphous carbon, chromium boride and powdery natural graphite at a high temperature.

The relationship between the amount of abrasion of the sliding members obtained from the mixture prepared by adding a fixed amount (10% by weight) of the powdery chromium boride to the powdery amorphous carbon and then adding the powdery natural graphite to the thus prepared mixture, and the amount of addition of the powdery natural graphite at a temperature of 300° C. is shown in FIG. 2, the relationship having been obtained by the experiment carried out under the experimental conditions aforementioned.

In comparing the graph in FIG. 2 with that in FIG. 1, the effect of addition of the component (c), i.e., powdery natural graphite is clearly understandable.

As seen from FIG. 2, the adequate amount of addition of the powdery natural graphite, powdery Kish graphite or the mixture thereof is 2 to 10% by weight, preferably 3 to 8% by weight based on the total amount of the three components.

Namely, the composite material for sliding members according to the present invention is obtained by a process comprising the steps of (1) mixing 5 to 20% by weight, preferably 7 to 15% by weight of at least one boride of a metal selected from the metals belonging to IVa group, Va group and VIa group of the periodic table, as the component (b), with 70 to 93% by weight, preferably 77 to 90% by weight of the powdery amorphous carbon as the component (a), (2) further mixing 2 to 10% by weight, preferably 3 to 8% by weight of the powdery natural graphite, the powdery Kish graphite or a mixture thereof as the component (c) with the thus obtained mixture, (3) thoroughly stirring the thus obtained mixture of the three components (a), (b) and (c), thereby uniformly dispersing the two components (b) and (c) in the component (a), and (4) after filling the thus prepared uniform mixture in a graphite mold, sintering the thus filled mixture under a pressure of higher than 100 kg/cm$^2$, preferably of 150 to 300 kg/cm$^2$ at a temperature of higher than 1500° C., preferably 1800° to 2500° C.

In addition, in the case of using powdery raw coke as the powdery amorphous carbon, the composite material for sliding members according to the present invention is available by mixing the powdery raw coke with the components (b) and (c), and sintering the thus obtained uniform mixture under normal pressure at the temperature of higher than 1500° C., preferably 1800° to 2500° C.

The thus obtained composite material of graphite-metal boride according to the present invention showing the above-mentioned specific properties is used as a material of high temperature-resistant and abrasion-resistant sliding members.

Such sliding members of graphite-metal boride according to the present invention show a friction coefficient of 0.01 to 0.09 and a specific amount of abrasion of 1.0 to $4.0 \times 10^{-8}$ mm$^2$/kg under the conditions of a load of 20 kg/cm$^2$ and a velocity of 5 m/min at a temperature of 300° C. (a specific amount of abrasion of 15.0 to $20.0 \times 10^{-8}$ mm$^2$/kg under the conditions of load of 20 kg/cm$^2$ and velocity of 5 m/min at a temperature of 600° C.), a bending strength of 230 to 900 kg.f/cm$^2$ and a Shore hardness of from 28 to 45.

The present invention will be explained more in detail while referring to the non-limitative examples as follows.

EXAMPLE 1

With 70 to 93% by weight of powdery calcined pitch coke of a particle size of less than 150 μm, 5 to 20% by weight of powdery chromium diboride of an average particle size of 7 μm and 2 to 10% by weight of powdery natural graphite were admixed to obtain a powdery uniform mixture in which the three components, i.e., the powdery coke, the powdery chromium diboride and the powdery natural graphite, are uniformly dispersed.

After filling the thus obtained powdery uniform mixture in a graphite mold, the mixture was heated to 2200° C. under a pressure of 200 kg/cm$^2$, and maintained for one hour at the temperature, thereby sintering the mixture in the mold. After cooling the sintered mixture to room temperature, the thus cooled, sintered mixture was put out from the mold to obtain 5 kinds of the composite material of graphite-chromium boride for sliding members according to the present invention. The physical properties and the friction-resistant and abrasion-resistant properties of the thus obtained five kinds (Specimens Nos. 1 to 5) as shown in Table 1, the friction-resistant and abrasion-resistant properties in Table 1 being the results of tests carried out under the Experimental conditions mentioned before.

EXAMPLE 2

In the same manner as in Example 1 except for admixing 10% by weight of powdery molybdenum diboride (MoB$_2$) and 5% by weight of powdery natural graphite with an amount of 85% by weight of the same powdery calcined pitch coke, a composite material of graphite-molybdenum diboride for sliding members was obtained, the physical properties and the friction-resistant and abrasion-resistant properties of the product (referred to as Specimen No. 6) being shown also in Table 1.

EXAMPLE 3

In the same manner as in Example 2 except for using vanadium diboride (VB$_2$) instead of molybdenum diboride in Example 2, a composite material of graphite-vanadium diboride for sliding members (referred to as Specimen No. 7) was obtained, the physical properties and the friction-resistant and abrasion-resistant properties of Specimen No. 7 being also shown in Table 1.

EXAMPLE 4

In the same manner as in Example 2 except for using zirconium dodecaboride (ZrB$_{12}$) instead of molybdenum diboride in Example 2, a composite material of graphite-zirconium dodecarboride for sliding members (referred to as Specimen No. 8) was obtained, the physical properties and the friction-resistant and abrasion-resistant properties of Specimen No. 8 being also shown in Table 1.

COMPARATIVE EXAMPLE

The following four kinds of the composite material for sliding members were respectively produced as Comparative Examples. Specimen Nos. 9 to 12 were treated in the same manner as in Example 1.

Specimen No. 9: produced from the mixture of 90% by weight of powdery calcined pitch coke and 10% by weight of powdery chromium diboride.

Specimen No. 10: prepared by using a conventional pitch binder.

Specimen No. 11: obtained by impregnating the molded graphite material for sliding members produced by using a pitch binder, with aluminum.

Specimen No. 12: produced by sintering a mixture obtained by mixing 10% by weight of powdery boron carbide with 90% by weight of powdery petroleum coke.

The physical properties and the friction-resistant and abrasion-resistant properties of Specimen Nos. 9 to 12 are also shown in Table 1.

TABLE 1

| Specimen No. | Amount of addition (% by weight) Amorphous carbon | Metal boride | Natural graphite | Shore hardness | Bulk density (g/cm$^3$) | Bulk strength (kg·f/cm$^2$) | Friction coefficient 25° C. | Friction coefficient 300° C. | Amount of abrasion (mm) | Specific amount of abrasion at 300° C. ($\times 10^{-8}$ mm$^2$/kg) | Specific amount of abrasion at 600° C. ($\times 10^{-8}$ mm$^2$/kg) |
|---|---|---|---|---|---|---|---|---|---|---|---|
| 1 | 90 | 5 | 5 | 40 | 1.91 | 240 | 0.17 | 0.04 | 0.002 | 1.0 | 19.0 |
| 2 | 88 | 10 | 2 | 39 | 1.94 | 305 | 0.16 | 0.05 | 0.006 | 3.0 | 18.5 |
| 3 | 85 | 10 | 5 | 38 | 1.94 | 300 | 0.15 | 0.04 | 0.004 | 2.0 | 18.0 |
| 4 | 80 | 10 | 10 | 34 | 1.97 | 290 | 0.15 | 0.06 | 0.005 | 2.5 | 19.0 |
| 5 | 75 | 20 | 5 | 30 | 2.14 | 770 | 0.16 | 0.06 | 0.008 | 4.0 | 19.0 |
| 6 | 85 | 10 | 5 | 35 | 2.04 | 340 | 0.18 | 0.06 | 0.004 | 2.0 | 18.0 |
| 7 | 85 | 10 | 5 | 40 | 2.04 | 460 | 0.17 | 0.07 | 0.007 | 3.5 | 19.0 |
| 8 | 85 | 10 | 5 | 42 | 2.05 | 500 | 0.19 | 0.08 | 0.008 | 4.0 | 20.0 |
| 9 | 90 | 10 | — | 40 | 1.95 | 400 | 0.22 | 0.15 | 0.010 | 5.0 | 80.0 |
| 10 | 100 | — | — | 35 | 1.64 | 265 | 0.23 | 0.17 | 0.012 | 6.0 | — |
| 11 | 100 | — | — | 73 | 2.10 | 1100 | 0.22 | 0.35 | 0.050 | 25.0 | — |
| 12 | 90 | 10*1 | — | 50 | 2.10 | 510 | 0.27 | 0.05 | 0.055 | 27.5 | 300 |

Note:
*1 powdery boron carbide

What is claimed is:

1. High temperature-resistant and abrasion-resistant sliding members of graphite-metal boride, showing a friction coefficient of 0.01 to 0.09 and a specific amount of abrasion of 1.0 to $4.0 \times 10^{-8}$ mm$^2$/kg determined under the conditions of a load of 20 kg/cm$^2$ and a sliding velocity of 5 m/min at a temperature of 300° C., a bending strength of 230 to 900 kg.f/cm$^2$ and a Shore hardness of 28 to 45, produced by sintering a uniform mixture of (a) 70 to 93% by weight of powdery amorphous carbon, (b) 5 to 20% by weight of at least one boride of a metal selected from metals belonging to IVa-group, Va-group and VIa-group of the periodic table, and (c) 2 to 10% by weight of powdery natural graphite, powdery Kish graphite or a mixture thereof.

2. Sliding members according to claim 1, wherein said powdery amorphous carbon is powdery coke, powdery anthracite, powdery carbon black, powdery charcoal or mixtures thereof.

3. Sliding members according to claim 1, wherein said boride of a metal is TiB, TiB$_2$, ZrB$_2$, ZrB$_{12}$, HfB$_2$, VB$_2$, NbB$_2$, TaB$_2$, CrB, CrB$_2$, MoB, MoB$_2$, Mo$_2$B, Mo$_2$B$_5$, WB, WB$_2$, W$_2$B, W$_2$B$_5$ or mixtures thereof.

4. Sliding members according to claim 1, wherein an average particle size of said powdery amorphous carbon and said powdery boride of a metal are 10 to 150 μm, 0.5 to 20 μm, respectively.

5. Sliding members according to claim 1, wherein said sintering treatment is carried out at a temperature of 1800° to 2500° C. under a pressure of 150 to 300 kg/cm$^2$.

* * * * *